United States Patent [19]

Ida et al.

[11] Patent Number: 4,510,669
[45] Date of Patent: Apr. 16, 1985

[54] REPLACEABLE GANG HEAD MACHINE TOOL

[75] Inventors: Jinsei Ida, Sayama; Tsutomu Fujita, Kawagoe; Ichiho Yamada, Kawagoe; Fumio Higuchi, Kawagoe; Kenzaburo Matsuo, Kawagoe, all of Japan

[73] Assignee: Honda Giken Kogyo Kabushiki Kaisha, Tokyo, Japan

[21] Appl. No.: 435,879

[22] Filed: Oct. 21, 1982

[30] Foreign Application Priority Data

Oct. 21, 1981 [JP] Japan .............................. 56-167022
Oct. 23, 1981 [JP] Japan .............................. 56-168807

[51] Int. Cl.³ .......................................... B23Q 3/157
[52] U.S. Cl. .................................................... 29/568
[58] Field of Search ............... 29/568, 26 A; 414/589; 51/168

[56] References Cited

U.S. PATENT DOCUMENTS

| 3,234,648 | 2/1966 | Knowles | 29/568 |
|---|---|---|---|
| 3,479,715 | 11/1969 | Hendrickson | 51/168 X |
| 3,650,018 | 3/1972 | Perry et al. | 29/568 |
| 3,846,904 | 11/1974 | Kuhnert | 29/568 |
| 3,858,286 | 1/1975 | Nohejl | 29/568 X |
| 3,895,427 | 7/1975 | Nakao et al. | 29/568 |
| 4,038,739 | 8/1977 | Nohejl | 29/568 |
| 4,110,898 | 9/1978 | Yamaoka et al. | 29/568 |
| 4,168,567 | 9/1979 | Leguy et al. | 29/568 |

FOREIGN PATENT DOCUMENTS

| 2617608 | 11/1977 | Fed. Rep. of Germany | 29/568 |
|---|---|---|---|
| 2031777 | 4/1980 | United Kingdom | 29/568 |
| 2077150 | 12/1981 | United Kingdom | 29/568 |
| 0852494 | 8/1981 | U.S.S.R. | 29/568 |

Primary Examiner—William R. Briggs
Assistant Examiner—Glenn L. Webb
Attorney, Agent, or Firm—Armstrong, Nikaido, Marmelstein & Kubovcik

[57] ABSTRACT

A replaceable gang head machine tool including a machine base, a working unit thereon, plural gang heads on the periphery of the working unit, and an index table on the upper side of the working unit, further including a supporting base positioned above the machine tool, a stock apparatus mounted on the supporting base comprising a center support, plural gang heads on the periphery of the center support, and an index table on the upper side thereof; and a replacing apparatus positioned away from the machine tool and the stock apparatus extending between the machine tool and the stock apparatus for effecting a replacement between the gang heads on the machine tool and the gang heads on the stock apparatus.

5 Claims, 5 Drawing Figures

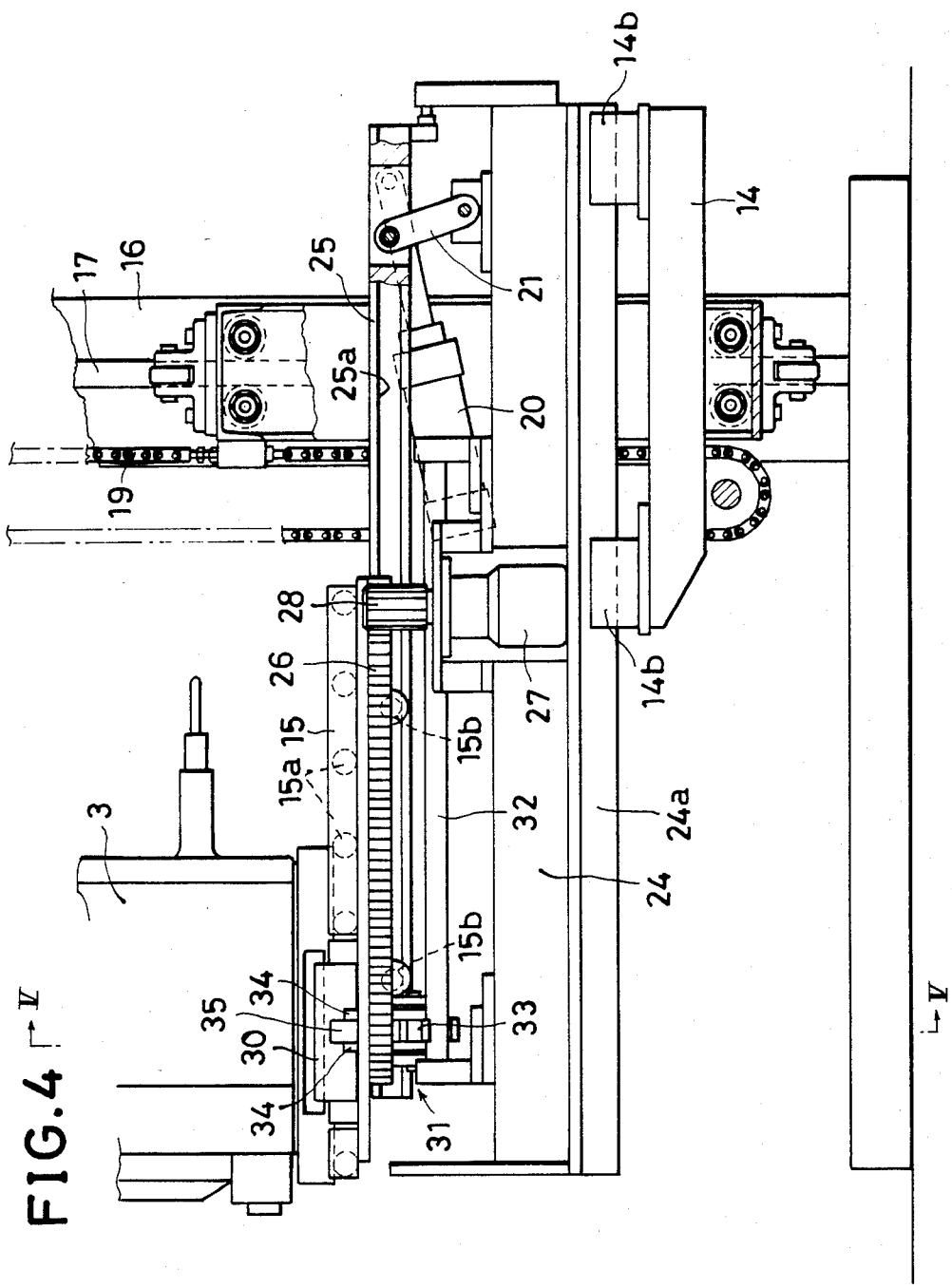

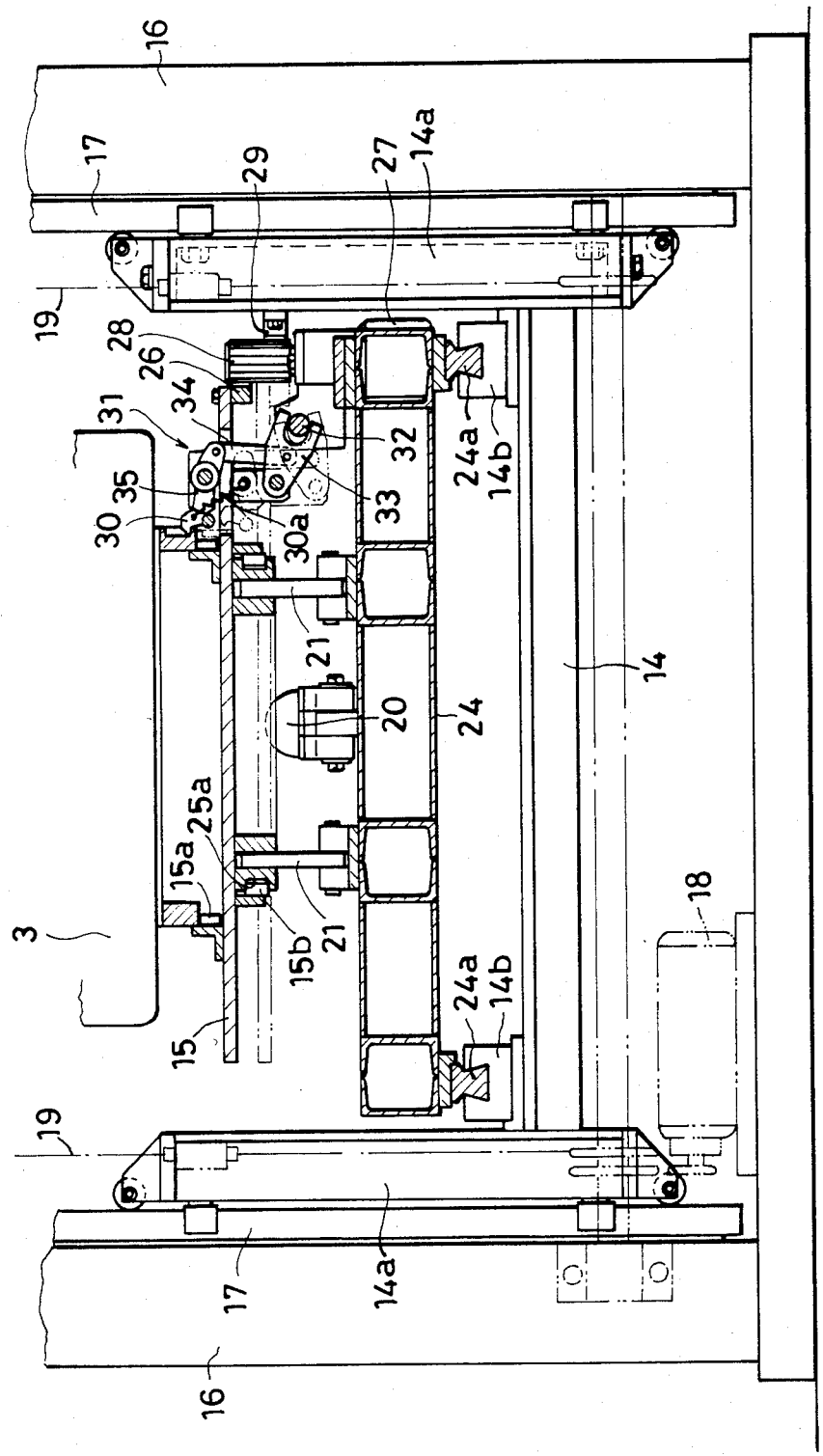

REPLACEABLE GANG HEAD MACHINE TOOL

BACKGROUND OF THE INVENTION

Replaceable gang head machine tools have been proposed which include a machine base provided thereon with a working unit, plural gang heads on the periphery thereof and an index table on the upper side thereof for selecting any desired one of the gang heads. It is so operated that any desired one of the gang heads is selected to be positioned in front of the front side of the working unit and then moves forward together with the unit, and a working operation is given to a workpiece positioned in front thereof. For example, one such machine is disclosed in U.S. Pat. No. 4,216,572. It is desirable in this type of machine tool that the gang heads on the machine tool should be replaceable with other additional gang heads stocked outside the machine tool ready to give any different working operation on a workpiece. For meeting this desire, there has been hitherto proposed a stock arrangement wherein the machine tool constructed as above is provided on its lateral outside with a stockyard extending long along the same. Plural gang heads are stocked therein so that the gang heads on the stockyard side and the gang heads on the machine tool side may be replaced one with another through an intermediate carrier interposed between the machine tool and the stockyard. For example, one such system is disclosed in U.S. patent application Ser. No. 95,556 filed on Nov. 19, 1979. This type of arrangement, however, is not always favorable because a comparatively large wide space is required on the lateral side of the machine tool, for providing or installing the stockyard and consequently the floor space needed for the machine tool unit becomes comparatively large in width.

OBJECTS AND SUMMARY OF THE INVENTION

It is an object of the present invention to provide a replaceable gang head machine tool which more effectively utilized the floor space of a factory.

It is a further object of the present invention to provide a machine tool in which the number of effective utilizable gang heads is increased by a very simple means.

It is a still further object of the present invention to provide a replaceable gang head machine tool having a stock means positioned thereabove and replacing means provided for transporting the gang heads from the stock means to the machine tool and vice versa.

It is still another object of the present invention to provide a replaceable gang head machine tool having a stock means positioned thereabove and a replacing means which is movable away from the machine tool with stock means to obtain or place further gang heads on an outside other magazine.

These and other objects are obtained in a replaceable gang head machine tool which includes a machine base, a working unit thereon, plural gang heads on the periphery of the working unit, and an index table on the upper side of the working unit for selecting any desired one of the gang heads, the machine tool further comprising a supporting base positioned above the machine tool, a stock means mounted on the supporting base comprising a center support, plural gang heads on the periphery of the center support, and an index table on the upper side thereof for selecting any desired one of the gang heads; and a replacing means positioned away from the machine tool end of the stock means extending between the machine tool and the stock means for effecting a replacement between the gang heads on the machine tool and the gang heads on the stock means.

The replacing means can comprise an elevating table which is movable upwards and downwards between a lowered position facing the machine tool and a raised position facing the stock means and a supporting table which is extendable toward an index position for the gang head positioned on one side of the periphery of the machine tool and serves to support the gang head at that index position from below. The supporting table is supported separately moveably upwards and downwards on the elevating table so as to begin a stroke of upward and downward movement necessary for attaching and detaching of the gang head to and from each of the machine tool and the stock means.

The supporting table can further include a hook member which is engageable with the bottom surface of the gang head at the index position and is moveable to advance and retreat along the supporting table. The supporting table can be moveable to advance and retreat between an advanced position and a retreated position.

The elevating table can include a slide table moveable to advance and retreat, a lift table on the upper side thereof moveable upwards and downwards with the supporting table being supported on the lift table, a first rack bar extending in the advancing and retreating directions thereof, and being in engagement with a pinion connected to a driving source provided on the sliding table, and a second rack bar arranged to be in engagement with the pinion on in opposite to the first rack bar.

The supporting table can further include a clamp means engageable with the gang head being operable to engage and disengage with the gang head according to upward and downward movements of the supporting table, a linkage means provided between the supporting table and the slide table connected to the clamp means for operation thereof, and an engaging member on the linkage means on the slide table arranged to be in slideable engagement with a guide bar provided along the slide table extending longitudinally in the advancing and retreating directions thereof.

BRIEF DESCRIPTION OF THE DRAWINGS

The above and other objects and the attendant advantages of the present invention will become readily apparent by references to the following detailed description when considered in conjunction with the accompanying drawings wherein:

FIG. 4 is a sectional view taken along the line IV—IV in FIG. 3 and

FIG. 5 is a sectional view taken along the line V—V in FIG. 4.

DETAILED DESCRIPTION OF PREFERRED EMBODIMENTS

Figure 1:
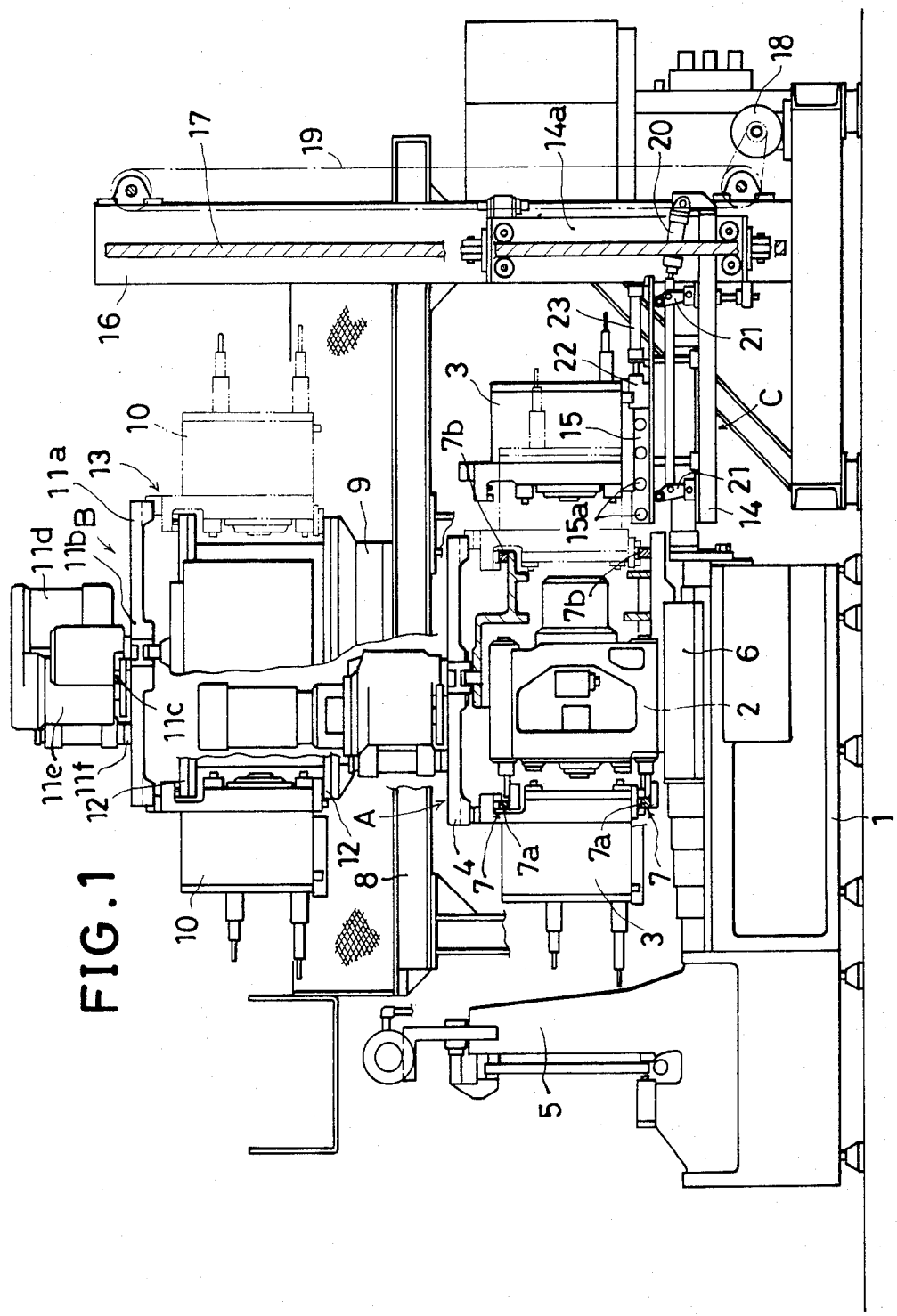
FIG. 1 is a side view of one example of this invention machine tool.
Figure 2:
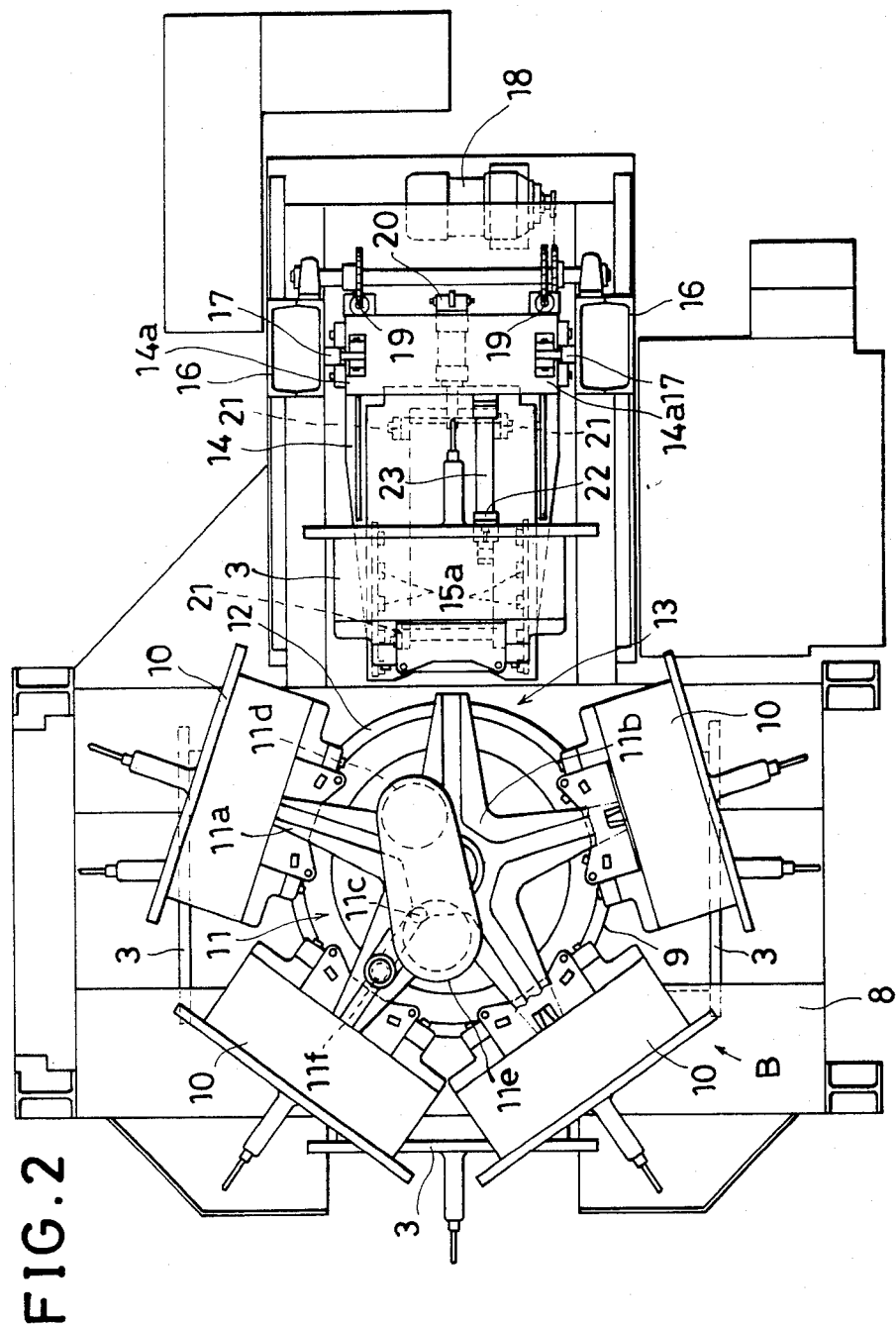
FIG. 2 is a top plan view thereof.

Embodying examples of this invention will now be explained with reference to the accompanying drawings:

Referring to FIGS. 1 and 2 showing one example thereof, a machine tool A is constructed of a machine base 1 provided thereon with a working unit 2, plural gang heads 3 on the periphery the working unit 2 and an index table 4 on the upper side thereof for selecting any desired one of the gang heads 3. Thus, it can be so operated that any desired one of the gang heads 3 is selected to be positioned in front of the forward side of the working unit 2 and can then be moved forwards together with the unit 2 to perform work on a workpiece 5 ahead of the unit 2 by the selected gang head.

More in detail, the working unit 2 is arranged to be moveable forwards and rearwards by means of a feeding table 6 on the lower side thereof. A pair of upper and lower annular rails 7, 7 each comprising a front moveable rail 7a and a rear stationary rail 7b, are provided on the periphery of the working unit 2 at the retreated position thereof. The gang heads 3 are disposed on the periphery of the rails 7 supported thereon in their hung conditions and are arranged to be moveable along the same. The number of gang heads 3 disposed on the circumference thereof may comprise, for instance, four as illustrated.

The machine tool as described above is not especially different in construction and operation from that disclosed in U.S. Pat. No. 4,216,572, and any further detailed explanation thereof is accordingly omitted.

According to the present invention, a stock means B is provided above the machine tool A. More in detail, there is provided a supporting base 8 in the form of a frame above the machine tool A. The supporting base is provided thereon with a center circular support 9, plural gang heads 10 on the periphery thereof and an index table 11 on the upper side thereof and an index table 11 on the upper side thereof for selecting any desired one of the gang heads 10.

More in detail, a pair of upper and lower annular rails 12, 12 are provided circularly on the periphery of the support 9. The gang heads 10 are disposed on the periphery of the rails 12 supported thereon in their hung conditions and are arranged to be moveable along the rails. In this case, the support 9 may be expected to have room for five gang heads therearound, for instance, and four of them are disposed thereon. One of them is previously removed so that a space 13 is left for replacement. The index table 11 is substantially the same in construction and operation as the index table 4 of the machine tool A, and has five index arms 11a corresponding to the five gang head positions 10. Each arm 11a and each corresponding head 10 are in engagement one with another through a pin and a pin groove. Additionally, the top surface of the index table 11 is formed as a Geneva gear 11b. A Geneva pin 11c arranged to be driven by a motor 11b through a reduction gear 11e is in engagement with the Geneva gear 11b, and there is additionally provided a stop pin 11f.

According to the present invention, there is additionally provided on the outside of the above machine tool, for instance, on the rear side thereof, a replacing means C which extends between the machine tool A and the stock means B for effecting a replacement between any desired one of the gang heads 3 of the former and any desired one of the gang heads 10 of the latter.

In the illustrated example, the replacing means C comprises an elevating table 14 which is moveable upwards and downwards between its lowered position facing the machine tool A and its raised position facing the stock means B, and a raised position facing the stock means B, and a supporting table 15 which extends towards an index position for the gang head positioned on the rear side of the periphery of the machine tool A and serves to support the gang head at the index position from below. The supporting table 15 is provided moveably upwards and downwards on the elevating table 14 so as to be given an additional stroke of upward and downward movements necessary for attaching and detaching the gang head to and from each of the machine tool A and the stock means B.

More in detail, the elevating table 14 is so supported, at its holder portions 14a, 14a on both sides thereof, as to be moveable upwards and downwards along on respective guide rails 17, 17 provided on respective vertical supports 16, 16 on both outsides thereof. The table 14 can be moved upwards and downwards through a chain 19 by a driving source 18 such as an electric motor or the like. The supporting table 14 is provided on the elevating table 14 so as to be separately moveable upwards and downwards through a parallel link mechanism 21 by a lift cylinder 20. Additionally, a hook member 22 which is engageable with the bottom surface of the gang head at the index position is provided on the supporting table 15 as to be moveable to advance and retreat by a shift cylinder 23. Thus, in such a case that the gang head 3 at the index position on the machine tool A intended to be detached therefrom, the gang head 3 is once lifted for being disengaged from the annular rails 7 by an upward movement of the supporting table 15, and thereafter the same is pulled out toward the rear side of the rails 7 by a retreat movement of the hook member 22. In such a case that the gang head 3 is intended to be attached to the machine tool A, the same is moved forwards by an advance movement of the hook member 22, and thereafter is lowered so as to be brought into engagement with the rails 7 by a downward movement of the supporting table 15. This is similarly applicable to the gang head 10 brought at an index position on the stock means B. Numeral 15a denotes a series of receiving rollers provided on each side of the supporting table 15 for supporting the gang head from below on both sides thereof.

The operation of the foregoing example arrangement will now be explained as follows:

In order that any desired one of the gang heads 3 on the machine tool A side may be replaced with any desired one of the gang heads 10 on the stock means B side, the desired one of the gang heads 3 on the machine tool A is selected to be turned at the index position on the rear side thereof, and, in the meantime, on the stock means B side the space 13 for replacement is selected to be turned at the index position on the rear side thereof. Under this condition, the replacing means C is operated as follows. Namely, the elevating table 14 is moved to its lowered position and the foregoing desired gang head is pulled out by the supporting table 15. Then the elevating table 14 is moved to its raised position and the desired one gang head supported thereon is pushed forwards towards the space 13 and attached to the stock means B side. Next, on the stock means B side, a predetermined one of the gang heads 10 is selected to be turned at the index position on the rear side thereof. Thereafter, the replacing means C is operated again as follows:

Namely, the elevating table 14 is moved to its raised position and the foregoing selected one is taken out thereby. Then the elevating table 14 is moved to its lowered position and the foregoing gang head 3 is pushed forwards therefrom and attached to the machine tool A side. If necessary, this replacing operation is repeated, and any desired number of replacements can be carried out.

In the foregoing example, however, when any desired one of the gang heads 3, 10 in a unit comprising the machine tool A and the stock means B is intended to be replaced with any desired one of other gang heads stocked outside the unit, the replacing means C becomes an obstacle.

Figure 3:
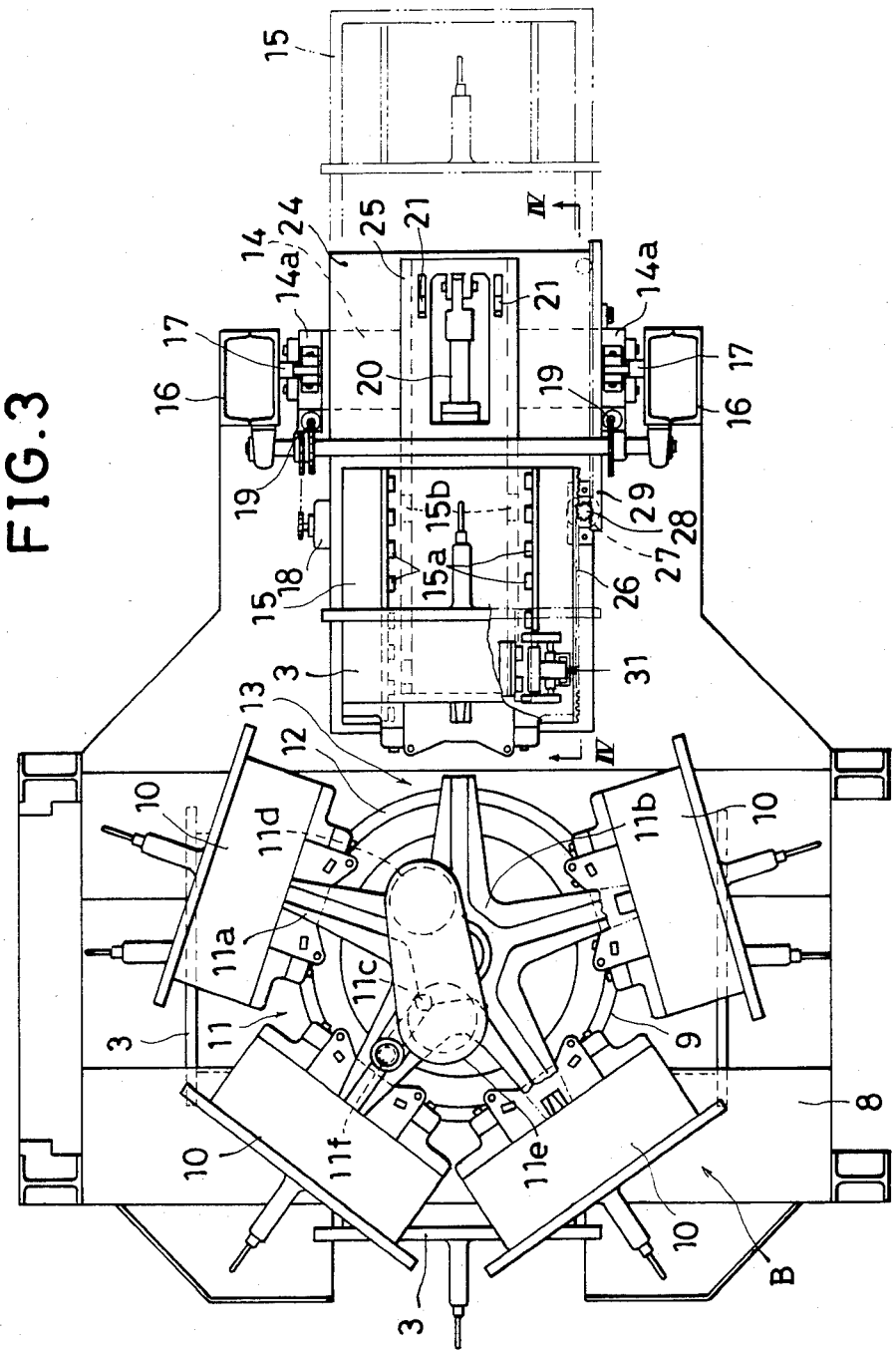
FIG. 3 is a top plan view of another example of this invention machine tool.

For overcoming this problem, there is provided an embodying example shown in FIGS. 3 to 5. Namely, in this example, the supporting table 15 is so arranged that when the elevating table 14 is in its lowered position, the same may be moved to advance and retreat between its advanced position shown by solid lines in FIG. 3 facing the foregoing index position and its retreated position shown by dotted lines in the same Figure on the outside, that is, on the rear outside of the replacing means C. Consequently, a replacing operation between any desired one of the gang heads 3, 10 in the unit and any desired one of the foregoing other gang heads stored on the outside of the unit can be easily carried out without being obstructed by the replacing means C, by moving the supporting table 15 to its retreated position.

More in detail, as shown clearly in FIGS. 4 and 5, a slide table 24 is provided on the elevating table 14, through rails 24a, 24a and rail supports 14b, 14b, so as to be moveable forwards and rearwards, and there is provided above the slide table 24 a lift table 25 which is moveable upwards and downwards through a lift cylinder 20 and a parallel link means 21. The supporting table 15 is supported on the lift table 25, through guide rollers 15b and guide grooves 25a, so as to be moveable forwards and rearwards. Additionally, the supporting table 15 is provided with a first rack bar 26 extending in the advancing and retreating directions thereof, and a pinion 28 connected to a driving source 27 such as an electric motor or the like provided on the slide table 24 in engagement with the first rack bar 26. A second rack bar 29 is fixedly provided on the holder portion 14a and is in engagement with the pinion 28 opposite to the first rack bar 26.

Additionally, in the illustrated example, instead of the hook member 22 in the foregoing first example, a clamp member 30 arranged to be brought into engagement with a side surface of a lower portion of the gang head is provided on the supporting table 15. The clamp member 30 is arranged to be operated to be brought into engagement with the gang head and disengage therefrom, through a linkage mechanism 31 provided between the support-table 15 and the slide table 24, according to upward and downward movements of the supporting table 15 caused by upward and downward movements of the lift table 25. An engaging member of the linkage mechanism 31 on the slide table 24 side is in slideable engagement with a guide bar 32 which is provided on the table 24 so as to extend longitudinally in the forward and rearward directions thereof.

More in detail, the linkage mechanism 31 comprises a first link member 33 which is pivotally attached to its one end portion, to the supporting table 15 and is in tiltable and slideable engagement, at its other end portion, with the guide bar 32 so that when the first link member 33 is given a swing movement by upward and downward movements of the supporting table 15, a swing arm 35 which is to be brought into contact with the clamp member 30 may be given a swing movement through a second link member 34. Thus, when the supporting table 15 is in its raised position, as shown by solid lines in FIG. 5, the clamp member 30 is closed and brought into engagement with the gang head. The clamp member 30 is kept in this condition, even in advancing and retreating movements of the supporting table 15, owing to a slide movement of the first link member 33 along on the guide bar 32. When the supporting table 15 is in its lowered position, as shown by dotted lines in the same Figure, the arm 35 is turned counter-clockwise to release the clamp member 30, and consequently the clamp member 30 is opened by a spring 30a.

Next, the operation of the foregoing example arrangement will be explained as follows:

Attaching and detaching operations of any one of the gang heads 3, 10 to and from the machine tool A and to and from the stock means B are carried out by upward and downward movements of the lift table 25, and small advancing and retreating movements of the supporting table 15 caused by the pinion 28 through the first rack bar 26. In an ordinary case, by these attaching and detaching operations and upward and downward movements of the elevating table 14, a replacement between the gang heads 3, 10 in the unit comprising the machine tool A and the stock means B can be carried out.

When any desired one of the gang heads in the unit is intended to be replaced with any desired one of other gang heads stocked outside the unit place, the selected one to be replaced in the unit is taken out and supported on the supporting table 15. Then the elevating table 14 is moved downwards to its lowered position and the pinion 28 is turned. The slide table is moved rearwards through the engagement between the pinion 28 and the second rack bar 29, and at the same time the supporting table 15 which is in engagement, at the first rack bar 26, with the pinion 28, is given a relative rearward movement in relation to the slide table 24. Consequently, the supporting table 15 is given a double speed movement, and therefore, is rapidly retreated from the advanced position to the retreated position on the rear side of the replacing means C. In this retreat movement, the lift table 25 is kept in its raised position and thereby the gang head on the supporting table 15 is fixed by the clamp member 30. At the retreated position thereof, the lift table 25 is lowered, so that the gang head is released from being fixed by the clamp member 30, and at this stage a replacing of the gang head with another one stocked outside is carried out.

Thus, according to this invention, there is provided above the machine tool having plural gang heads the stock means having plural gang heads, and additionally there is provided the replacing means extending vertically between the machine tool and the stock means so that a replacement between any desired one of the gang heads of the machine tool and any desired one of the stock means may be carried out through the replacing means. As a result, a space occupied by this invention apparatus becomes less than that by the previously proposed machine tool having a stockyards extending long along the same, and the whole thereof can be installed in a space of comparatively small width and the installation thereof can be facilitated.

According to another feature of this invention, the machine tool unit is so arranged that the supporting table thereof may be moveable toward the outside of the unit, and accordingly a replaceing between any desired one of the gang heads in the unit and any desired one of gang heads stocked outside the unit can be carried out.

It is readily apparent that the above-described replaceable gang head machine tool meets all of the objects mentioned above and also has the advantage of wide commerical ability. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A replaceable gang head machine tool including a machine base, a working unit thereon, plural gang heads on the periphery of the working unit, and an index table on the upper side of the working unit for selecting any desired one of the gang heads, further comprising a supporting base positioned above the machine tool, stock means mounted on said supporting base and comprising a center support, plural gang heads on the periphery of the center support, and an index table on the upper side thereof for selecting any desired one of the gang heads, and a replacing means positioned away from said machine tool and the stock means extending between the machine tool and the stock means for effecting a replacement between the gang heads on the machine tool and the gang heads on the stock means, the replacing means comprising an elevating table which is moveable upwards and downwards between a lowered position facing the stock means, a supporting table which is extendable towards an index position for the gang head positioned on one side of the periphery of the machine tool and serves to support the gang head at that index position from below, means for extending the support table, the supporting table being supported separately moveably upwards and downwards on the elevating table so as to be given a stroke of upward and downward movements necessary for attaching and detaching of the gang head to and from each of the machine tool and the stock means, and means for separately moving the support table up and down on the elevating table.

2. A machine tool of claim 1, wherein said supporting table includes a hook member which is engageable with the bottom surface of the gang head at the index position and is moveable to advance and retreat along the supporting table.

3. A machine tool of claim 1, wherein the supporting table is moveable to advance and retreat between an advanced position facing the index position of the gang head and a retreated position on the outside of the replacing means.

4. A machine tool of claim 3, wherein the elevating table includes a slide table moveable to advance and retreat; a lift table on the upper side thereof movable upwards and downwards, the supporting table being supported on the lift table so as to be moveable to advance and retreat; a first rack bar extending in the advancing and retreating directions thereof, the first rack bar being in engagement with a pinion connected to a driving source provided on the slide table; and a second rack bar arranged to be in engagement with the pinion in opposite to the first rack bar provided on the elevating table.

5. A machine tool of claim 4, wherein the supporting table further includes a clamp means engageable with the gang head, the clamp means being operable to engage and disengage with the gang head according to upward and downward movements of the supporting table, a linkage means provided between the supporting table and the slide table connected to the clamp means for operation thereof, and an engaging member on the linkage means on the slide table side arranged to be in slideable engagement with a guide bar provided along the slide table extending longitudinally in the advancing and retreating directions thereof.

* * * * *

UNITED STATES PATENT AND TRADEMARK OFFICE
CERTIFICATE OF CORRECTION

PATENT NO.  :  4,510,669
DATED       :  April 16, 1985
INVENTOR(S) :  JINSEI IDA ET AL It is certified that error appears in the above-identified patent and that said Letters Patent is hereby corrected as shown below:

Column 7, line 32, after "position" insert --- facing the machine tool and a raised position ---.

Signed and Sealed this

Fifth Day of November 1985

[SEAL]

Attest:

Attesting Officer

DONALD J. QUIGG

Commissioner of Patents and Trademarks